INVENTORS
HEINZ BREITWIESER
OTTO HEINZ
ATTORNEYS

March 31, 1970   H. BREITWIESER ETAL   3,503,839
DECORATIVE SHEETS MADE OF PLASTICS
Filed Dec. 2, 1965   4 Sheets-Sheet 2
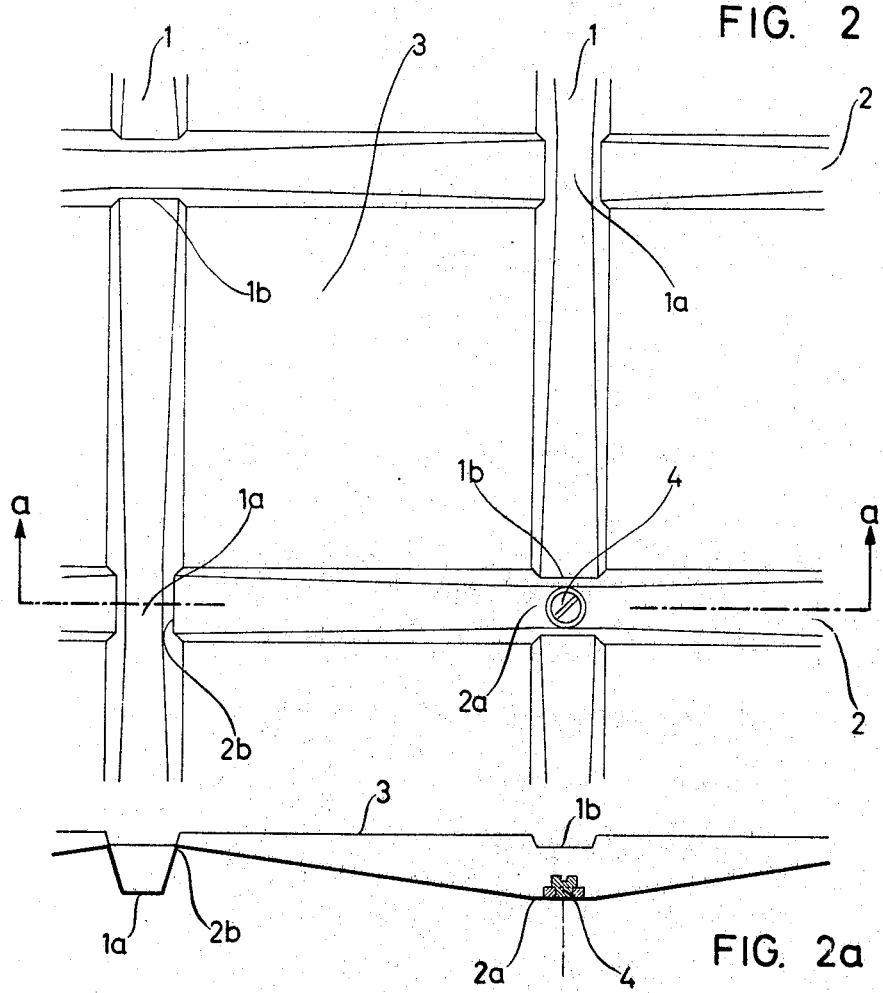
INVENTORS
HEINZ BREITWIESER
OTTO HEINZ
BY Curtis, Morris & Safford
ATTORNEYS

3,503,839
DECORATIVE SHEETS MADE OF PLASTICS
Heinz Breitwieser and Otto Heinz, Frankfurt am Main, Germany, assignors to Farbwerke Hoechst Aktiengesellschaft vormals Meister Lucius & Bruning, Frankfurt am Main, Germany
Filed Dec. 2, 1965, Ser. No. 511,070
Int. Cl. B32b *3/30*
U.S. Cl. 161—130    10 Claims

ABSTRACT OF THE DISCLOSURE

An article of manufacture has been provided which is a decorative wall covering of a plastic material of substantially the same thickness having a front surface and a back surface, each of the surfaces defining a complementary surface of the other, the front surface having geometrical lands and grooves, each of the lands being surrounded by grooves which are at different depth in respect to each other of at least one of the groove intersections surrounding the same land, the depth and width of each of the grooves accommodating heat expansion and contraction of said plastic under varying temperature conditions without distorting the lands of the wall covering and the intersections of the grooves at different heights providing for unconstrained transmission of heat expansion in said wall covering. Grooveless wall coverings where adjacent lands intersect each other below and above the surfaces of each have also been provided which similarly absorb the heat expansion and transmit this expansion throughout the panel.

---

The present invention relates to decorative sheets of plastics which are provided with a regular groove grating formed by crossing groove webs.

For exterior cladding and wall panelling in modern overground workings, sheets of thermoplastic or thermosetting material which have been shaped by various processes are gaining increasing importance.

It has already been proposed to use cover sheets which are folded in two directions like an accordion. This mode of shaping has the disadvantage that the reinforcement of the sheets in a longitudinal direction is not the same as in a transverse direction. Furthermore, the inclined surfaces of the sheets give rise to the formation of relatively large deposits of dust and the fastening screws are distinctly visible on the surface, which is undesirable.

In another known mode of shaping the surfaces of cover sheets in order to reinforce them and stabilize their length, the sheet surface is provided with projecting and recessed spherical caps of various diameters which are arranged in a determined manner. Such sheets have, however, an irregular appearance and must therefore generally be covered in their turn, for example, by plane sheets. Their lengths stability under heat is also unsatisfactory.

It has also been proposed to use cover sheets provided with regular groove gratings consisting of crossing groove webs, which permit the sheet surface to work in the plane of the groove openings in order to compensate dilatations under heat. Such sheets have the disadvantage that the groove webs are uniformly high in a longitudinal and a transverse direction so that the sheets are reinforced by the groove grating only to a limited extent and that phenomena of heat expansion cannot be compensated by the groove bottom but become effective over the whole length and width of the sheet.

Now we have found that the above disadvantages of decorative sheets of plastics, provided with a regular groove grating formed by crossing groove webs can be avoided by designing the sheets in a manner such that at the crossing points at least one of four crossing groove webs is lower than the other three groove webs at the same crossing point.

The groove grating of the invention may be designed, for example, in a manner such that high and low groove webs alternate regularly in a longitudinal and a transverse direction. The arrangement may be, for example, such that a high web runs over three grating units and is then followed by a low web running over one grating unit.

In another mode of designing the sheets in accordance with the invention, the height of the groove webs running in a longitudinal and a transverse direction varies in regular repetition in the individual webs themselves, whereby at the crossing points an increased height of a web running in one direction of the sheet corresponds to a reduced height of the web crossing the first mentioned web. By designing decorative sheets having a regular groove grating in accordance with the invention in a manner such that the groove webs are of different height at the crossing points, variations in length of the webs can be compensated by elastic yielding of the walls of the crossing groove. Such alterations in length do not, therefore, affect the groove bottom over the whole length or width of the sheet. Moreover, the sheets are uniformly reinforced in a longitudinal and a transverse direction. Fixing means can be disposed at the lowest parts of the webs in a visually inconspicuous manner. When neighboring sheets overlap each other, the edge of the upper sheet may lie in a visually inconspicuous manner in a groove of the sheet lying beneath.

The invention will now be described, by way of example only, with reference to the accompanying drawings in which:

FIG. 2 is a plan view of the sheet shown in FIG. 1 in which the groove webs have been broadened to form channels in order to produce a decorative effect;

FIG. 2a is a cross-section on line *a—a* of FIG. 2;

Figure 1:
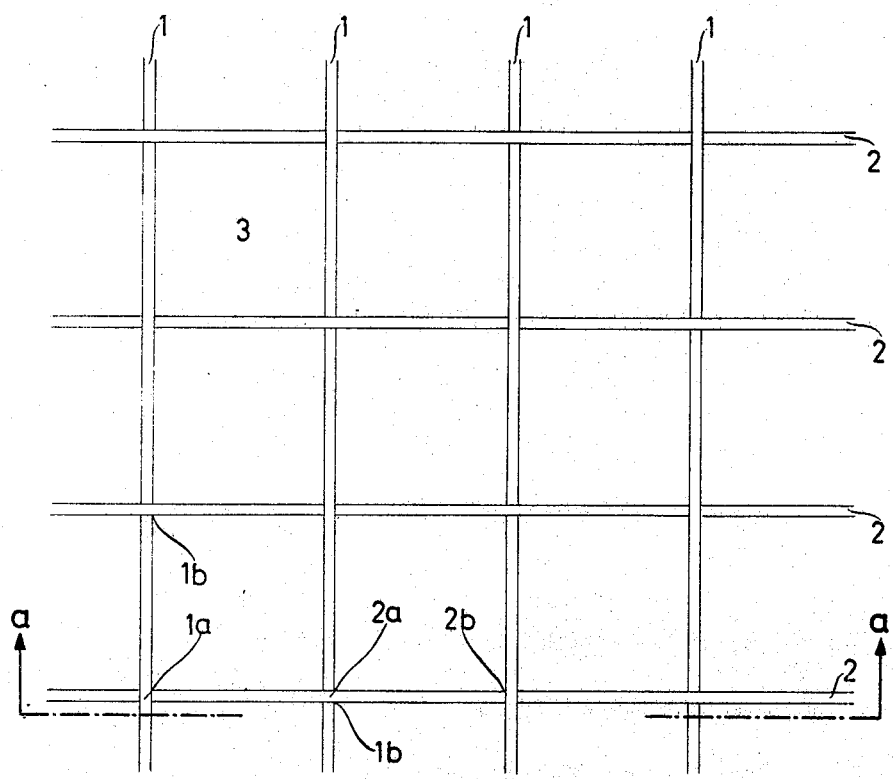
FIG. 1 is an underside view of the sheet of the invention in which the height of the groove webs varies in the individual groove webs themselves.

Referring to the individual figures:

FIG. 1 shows the underside of a sheet designed in accordance with the invention, which is provided with longitudinal groove webs 1 and transverse groove webs 2 between which sheet surfaces 3 are disposed. As can be seen from FIGS. 1a and 1b, the height of groove webs 1 and 2 increases and decreases, respectively, from crossing point to crossing point as shown at 1a and 1b, and 2a and 2b. It can be seen from the drawing that at each crossing point two groove webs of increased height cross, at right angles, two groove webs of reduced height, thus enabling alterations in length of the groove webs to be compensated by elastic yielding of the crossed groove.

Figure 1A:
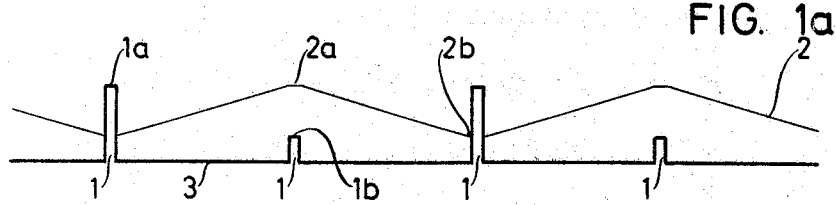
FIG. 1a is a cross-section on line *a—a* of FIG. 1.
Figure 1B:
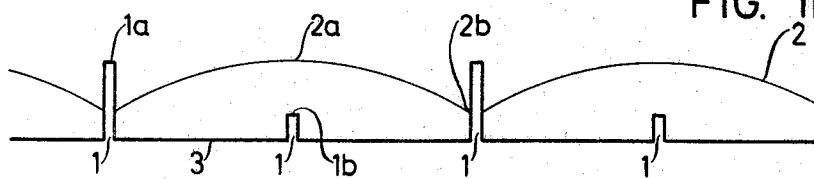
FIG. 1b is a cross-section on line *a—a* of FIG. 1 with another form of the groove webs.

FIG. 2 is a plan view and FIG. 2a is a cross-section of a sheet having a similar groove grating as in FIGS. 1, 1a and 1b, groove webs 1 and 2 being, however, widened to form channels. As shown at 1a, 1b, and 2a and 2b and illustrated in FIG. 2a, the depth of the channels varies from crossing point to crossing point whereby, as in the above mode of construction, alterations in length can be compensated by elastic yielding of the groove walls. Between channels (groove webs) 1 and 2, sheet surfaces 3 are arranged. A screw serving as fixing means is represented at 4.

Figure 3:
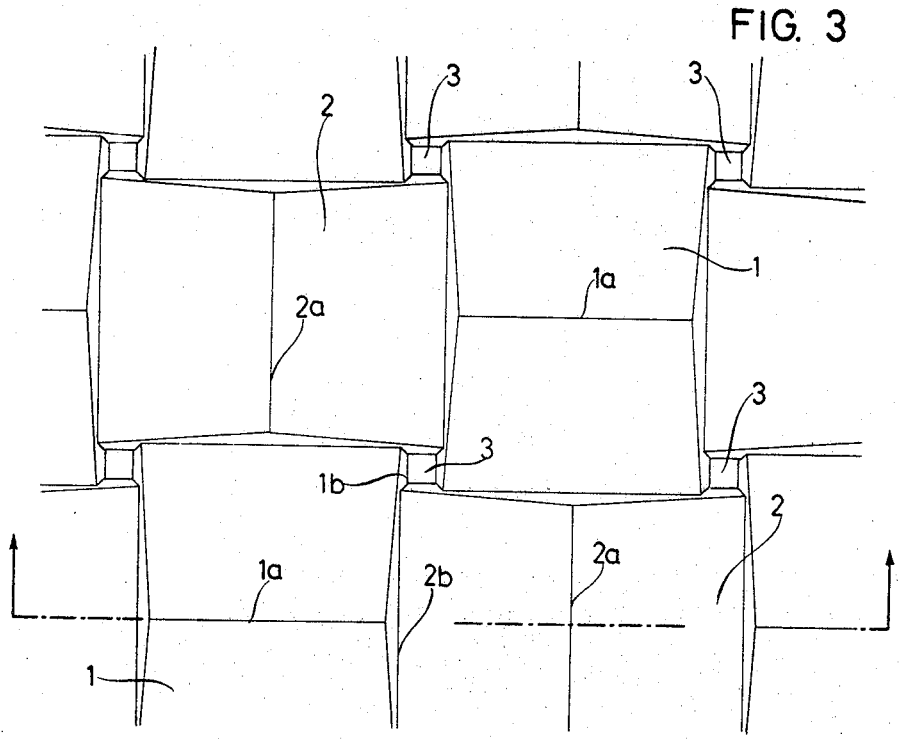
FIG. 3 is a plan view of a sheet according to FIGS. 1 and 2 with extremely broadened groove webs.
Figure 3A:
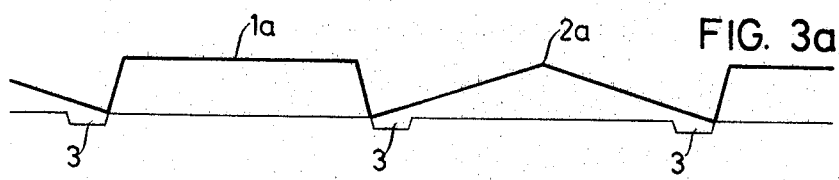
FIG. 3a is a cross-section on line *a—a* of FIG. 3.
Figure 3B:
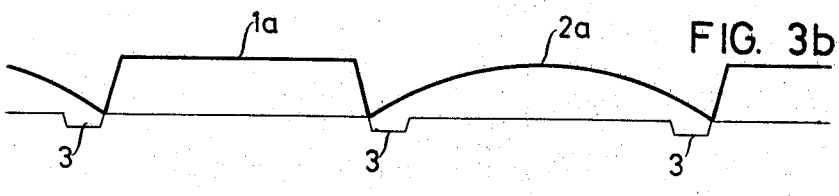
FIG. 3b is a cross-section on line *a—a* of FIG. 3 with another form of the groove webs.

FIG. 3 is a plan view and FIGS. 3a and 3b are cross-sections of another form of the sheets of FIGS. 1 to 2a, in which groove webs 1 and 2 have been extremely widened. Of the range of modes of construction shown in FIGS. 1 to 3, any desired variations of the width of the groove webs may be chosen, without leaving the scope of the invention.

Figure 4:
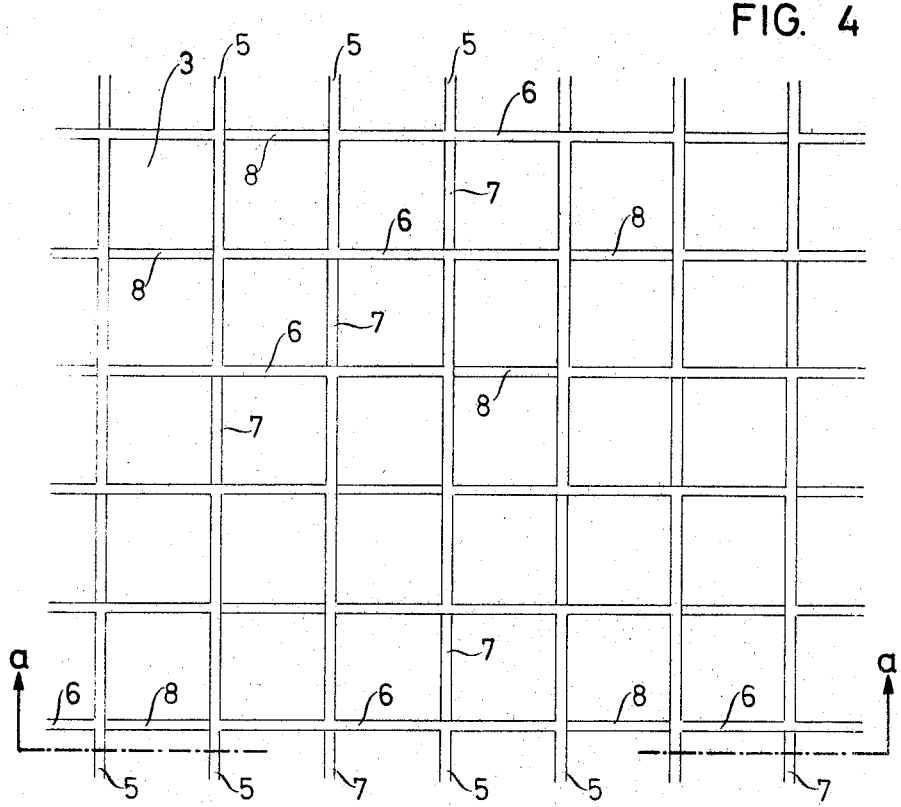
FIG. 4 is an underside view of the sheet of the invention with alternating high and low groove webs in which one web is lower at the crossing points than the other three webs crossing at the same point.
Figure 4A:
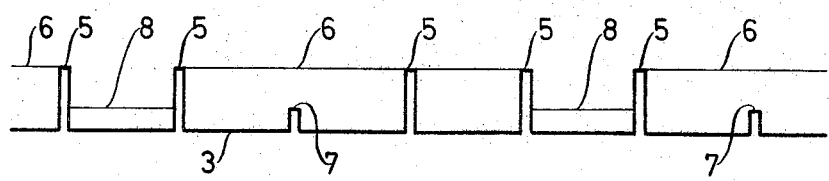
FIG. 4a is a cross-section on line *a—a* of FIG. 4.

FIG. 4 is an underside view and FIG. 4a is a cross-section of a sheet in which the height of the groove webs does not vary in the individual webs themselves but in which high and low groove webs alternate in regular repetition. The high groove webs are denoted in one direction by 5 and in a direction perpendicular to the first direction by 6. The low groove webs are designated by 7 in the direction of groove webs 5, and by 8 in the direction of groove webs 6. The sheet surfaces between the groove webs are designated by 3. FIGS. 4 and 4a show that at each crossing point a lower groove web 7 or 8 crosses a higher groove web 5 or 6. The effect with respect to reinforcement and compensation of heat expansion is the same as in the mode of construction described above in which the height of groove webs varies in the individual webs themselves.

The sheets designed in accordance with the invention are made in an economically advantageous manner in the form of large sheets or in the form of sheetings. All of the above examples of designing the decorative sheets of the invention can be used for covering walls as well as ceilings.

Materials suitable for the manufacture of the sheets of the invention are, for example, glass-fiber reinforced polyester resins obtained by the known casting and compression molding processes or fiber spraying processes. Other thermosetting plastics may also be used.

When the sheets are manufactured from thermoplastic materials, the latter are advantageously used in the form of semi-finished goods, that is in the form of plane sheets, which are then shaped to obtain the sheets of the invention in a continuous or discontinuous process by compression molding or drawing under pressure or reduced pressure at elevated temperatures.

As thermoplastic materials there are advantageously used polymethacrylates, rigid polyvinyl chloride free from plasticizer and, preferably, polyvinyl chloride free from plasticizer which has been modified by adding chlorinated polyolefins to improve the impact strength.

We claim:

1. As an article of manufacture, a decorative wall covering of a plastic material of substantially the same thickness throughout having a plurality of land and groove sections, said groove sections being provided as two series, one longitudinally and another transversely to the longitudinal grooves, each of said grooves defining a plurality of parallel channel members each channel member having alternatively high and low groove sections in staggered relationship to alternative channel members, the transverse groove sections defining a plurality of parallel channel members also having alternative higher and lower groove sections and with the groove sections of alternative staggered relationship with respect to the next parallel channel member so that the higher grooves of the longitudinally extending channel members are above the lower grooves of the transversely extending channels.

2. The article of manufacture according to claim 1 and wherein the lands are flat and rectangular and wherein the alternative grooves are of uniform width.

3. The article of manufacture according to claim 1 and wherein the lands are flat and rectangular and the grooves have sloping sides defining a bottom of a channel member of varying width.

4. The article of manufacture according to claim 1 and wherein longitudinal bottom surface of the channel members is rectilinear.

5. The article of manufacture according to claim 1 and wherein the longitudinal bottom surface of the channel member is curvilinear.

6. The article of manufacture according to claim 1 and wherein the transverse bottom surface of the channel member is rectilinear.

7. As an article of manufacture, a decorative wall covering of a plastic material of substantially the same thickness throughout having a plurality of rectangular lands and depressions, said lands being of relatively larger surface area to said depressions, said lands being provided as two series, one series longitudinally with respect to the longer side of the land in the longitudinal series, and another series transversely with respect to the longer side of lands in the longitudinal series, each of the longitudinal lands in the longitudinal series of lands being separated from the next longitudinal land by a transverse land and each longitudinal land on the narrow side of said land intersecting the transverse land below the surface of the longer side of the transverse land, each transverse land in the transverse series of lands being separated by a longitudinal land and the shorter side of the transverse land intersecting the longitudinal land below the surface of the longer side of the longitudinal land, about a half of the difference in the length of the longer and shorter sides of the longitudinal and transverse series of lands defining the length of the sides respectively of each of the depressions which depressions are located at each corner of the lands.

8. The article of manufacture according to claim 7 and wherein each of the lands in the longitudinal and transverse series of lands is subdivided by two equal sized rectangular lands meeting along a common apex line bisecting each of the lands.

9. The article of manufacture according to claim 7 and wherein each of the lands of the longitudinal and transverse series is a curvilinear surface of a cylinder.

10. As an article of manufacture, a decorative wall covering of a plastic material of substantially the same thickness throughout having a plurality of land and groove sections, said groove sections being provided as two series, one longitudinally and another transversely to the longitudinal grooves, each of said grooves defining a plurality of parallel channel members each channel member having alternatively high and low groove sections in staggered relationship to each channel member, said staggered relationship in each channel member in both the longitudinal and transverse channel member consisting of low groove sections extending for a length of three lands and interrupted by a high groove section extending for the length of one land, each of the high groove sections offset relative to the next parallel channel member by one land in each of the longitudinal and transverse series of grooves.

References Cited

UNITED STATES PATENTS

| 1,940,862 | 12/1933 | Henderson | 52—664 |
| 2,032,693 | 3/1936 | Fries et al. | 52—668 |
| 2,742,391 | 4/1956 | Warp. | |
| 2,275,575 | 3/1942 | Vrooman | 161—130 |
| 3,018,015 | 1/1962 | Agriss et al. | 161—130 |

MORRIS SUSSMAN, Primary Examiner

U.S. Cl. X.R.

52—664, 668, 669

PO-1050
(5/69)

UNITED STATES PATENT OFFICE
CERTIFICATE OF CORRECTION

Patent No. 3,503,839      Dated March 31, 1970

Inventor(s) Heinz Breitwieser and Otto Heinz

It is certified that error appears in the above-identified patent and that said Letters Patent are hereby corrected as shown below:

Column 1, line 7, after "Ser. No. 511,070"
there should appear

--Claims priority, application
Germany, December 19, 1964
F 44,762.--

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents